(12) United States Patent
Pomaranski et al.

(10) Patent No.: US 7,418,367 B2
(45) Date of Patent: Aug. 26, 2008

(54) SYSTEM AND METHOD FOR TESTING A CELL

(75) Inventors: Ken G. Pomaranski, Roseville, CA (US); Andrew H. Barr, Roseville, CA (US); Dale J. Shidla, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 179 days.

(21) Appl. No.: 10/699,423

(22) Filed: Oct. 31, 2003

(65) Prior Publication Data

US 2005/0096875 A1   May 5, 2005

(51) Int. Cl.
*G06F 11/30* (2006.01)

(52) U.S. Cl. ........................... 702/185; 702/122
(58) Field of Classification Search ............... 702/122, 702/185
See application file for complete search history.

(56) References Cited

U.S. PATENT DOCUMENTS

| | | | |
|---|---|---|---|
| 3,812,468 A * | 5/1974 | Wollum et al. ............ 714/4 |
| 4,684,885 A | 8/1987 | Chapman et al. |
| 5,327,435 A | 7/1994 | Warchol |
| 5,623,643 A | 4/1997 | Janssen et al. |
| 6,009,539 A | 12/1999 | Ranson |
| 6,141,768 A | 10/2000 | Lin et al. |
| 6,199,179 B1 * | 3/2001 | Kauffman et al. ........... 714/26 |
| 6,425,094 B1 * | 7/2002 | Drogichen et al. ........... 714/41 |
| 6,560,729 B1 | 5/2003 | Anuntapong et al. |
| 2004/0103394 A1 * | 5/2004 | Manda et al. ............ 717/126 |

FOREIGN PATENT DOCUMENTS

| | | |
|---|---|---|
| EP | 0 598 526 | 5/1994 |
| EP | 0 917 057 | 5/1999 |
| WO | WO 01/11468 | 2/2001 |

OTHER PUBLICATIONS

Myers, J. J., "Resource Control Unit," IBM Technical Disclosure Bulletin, vol. 16, No. 12, pp. 4089-4090 (May 1974).
GB Search Report for Application No. GB0423670.9 mailed on Feb. 9, 2005 (3 pages).

* cited by examiner

*Primary Examiner*—Bryan Bui
*Assistant Examiner*—Stephen J Cherry

(57) ABSTRACT

A computer system including a system module, a test module, a first cell, and a second cell is provided. The system module is configured to cause the test module to test the first cell subsequent to the second cell being allocated to a first instance of an operating system.

20 Claims, 10 Drawing Sheets

US 7,418,367 B2

SYSTEM AND METHOD FOR TESTING A CELL

BACKGROUND

Larger computer systems generally include a number of discrete subsystems, known as cells, for performing tasks under control of an operating system. In these systems, multiple copies of an operating system may be running at the same time. Each copy of the operating system is referred to as an instance of the operating system. Each instance of the operating system causes tasks to be performed by having one or more cells allocated to it and causing the cell(s) to perform the tasks. The type and number of cells allocated to an instance of the operating system may vary over time with the type and number of tasks the instance has to perform.

A system may include a number of cells that are not allocated to an instance of the operating system at a given time. These cells, known as floating cells, remain unused until they are allocated to an instance of the operating system. The other cells, known as allocated or owned cells, are under the control of an instance of the operating system. Many of the allocated cells may be constantly used by their respective operating system instances. Some of these allocated cells, however, may go unused by the instance to which the cells are allocated for relatively long periods of time.

The reliability of a computer system may depend on the reliability of the individual cells in the system. For example, if a cell in the system fails, the failing cell could potentially cause other cells in the system to fail and cause undesirable results to occur during operation of the system. Because both floating and allocated cells may be unused for relatively long periods of time, failures associated with these cells may take extended amounts of time to appear and may cause undesirable results when they do appear.

Accordingly, it would be desirable to be able to detect cell failures in a computer system before the failures cause undesirable results during operation of the system.

SUMMARY

According to one exemplary embodiment, a computer system is provided that includes a system module, a test module, a first cell, and a second cell. The system module is configured to cause the test module to test the first cell subsequent to the second cell being allocated to a first instance of an operating system.

DETAILED DESCRIPTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

In one aspect of the present disclosure, a computer system includes a test module configured to perform tests on cells in the computer system during operation of the computer system. To test a cell, a system module causes the cell to be de-allocated from use by an operating system, if necessary, and then causes a test module to perform functional and/or electrical tests on the cell. The test module detects any errors in response to the tests and causes remedial action to be performed by the system module in response to any errors.

Figure 1:
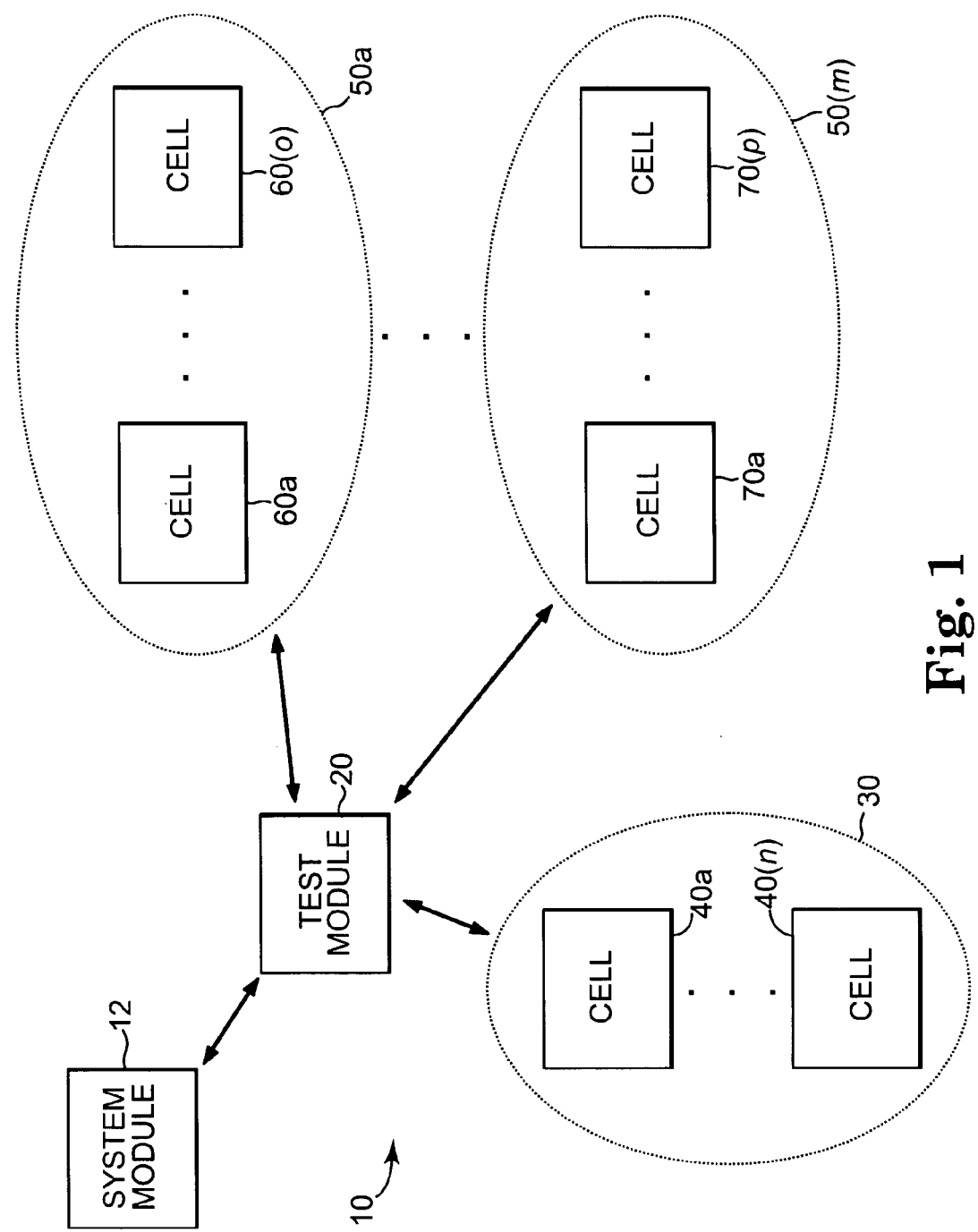
FIG. 1 is a block diagram illustrating an embodiment of a computer system that includes a system for testing a cell.

FIG. 1 is a block diagram illustrating an embodiment of a computer system 10 that includes a system for testing a cell. Computer system 10 is configured to execute multiple instances of an operating system (not shown) and includes a system module 12, a test module 20, a set of floating cells 30, and sets of cells allocated to instances of an operating system 50a through 50(m) where m is greater than or equal to one and represents the mth instance of the operating system.

The set of floating cells 30 includes cells 40a through 40(n) where n is greater than or equal to one and represents the nth cell. The set of cells allocated to the first instance of the operating system 50a includes cells 60a through 60(o) where o is greater than or equal to one and represents the oth cell, and the set of cells allocated to the mth instance of the operating system 50(m) includes cells 70a through 70(p) where p is greater than or equal to one and represents the pth cell. Each set 30 and 50a through 50(m) may include any number of cells.

As used herein, 'operating system instance 50' refers to any one of the sets of cells allocated to an instance of the operating system 50a through 50(m). 'Cell 40', 'cell 60', and 'cell 70' refers to any one of cells 40a through 40(n), cells 60a through 60(o), and cells 70a through 70(p), respectively, and 'cells 40', 'cells 60', and 'cells 70' refers to the set of cells 40a through 40(n), cells 60a through 60(o), and cells 70a through 70(p), respectively.

System module 12 comprises hardware and/or software configured to manage computer system 10. In particular, system 12 allocates floating cells 40 to operating system instances 50 in response to requests from the instances and de-allocates cells 60 and 70 in response to releases from the instances. System 12 also causes floating cells 40 as well as allocated cells 60 and cells 70 to be tested periodically during operation of computer system 10 using test module 20.

Test module 20 comprises hardware and/or software configured to test cells 40, cells 60, and cells 70 of computer system 10. In response to signals from system module 12, test module 20 performs functional and/or electrical tests on individual cells 40, 60, and 70. Test module 20 detects any errors that occur in response to the tests and causes remedial action to be taken by system module 12 in response to the errors.

Figure 2A:
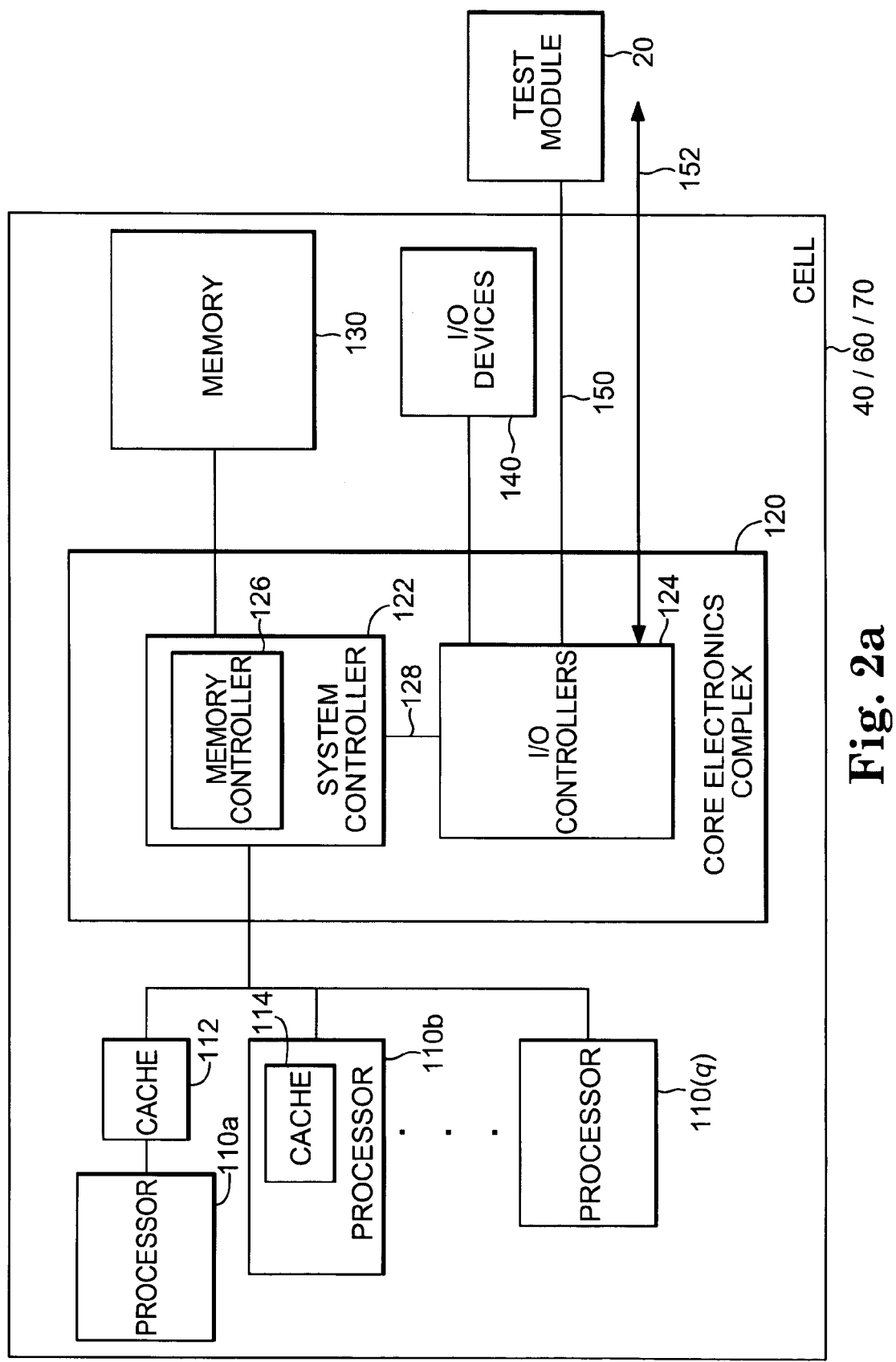
FIG. 2a is a block diagram illustrating an embodiment of selected portions of the computer system shown in FIG. 1.
Figure 2B:
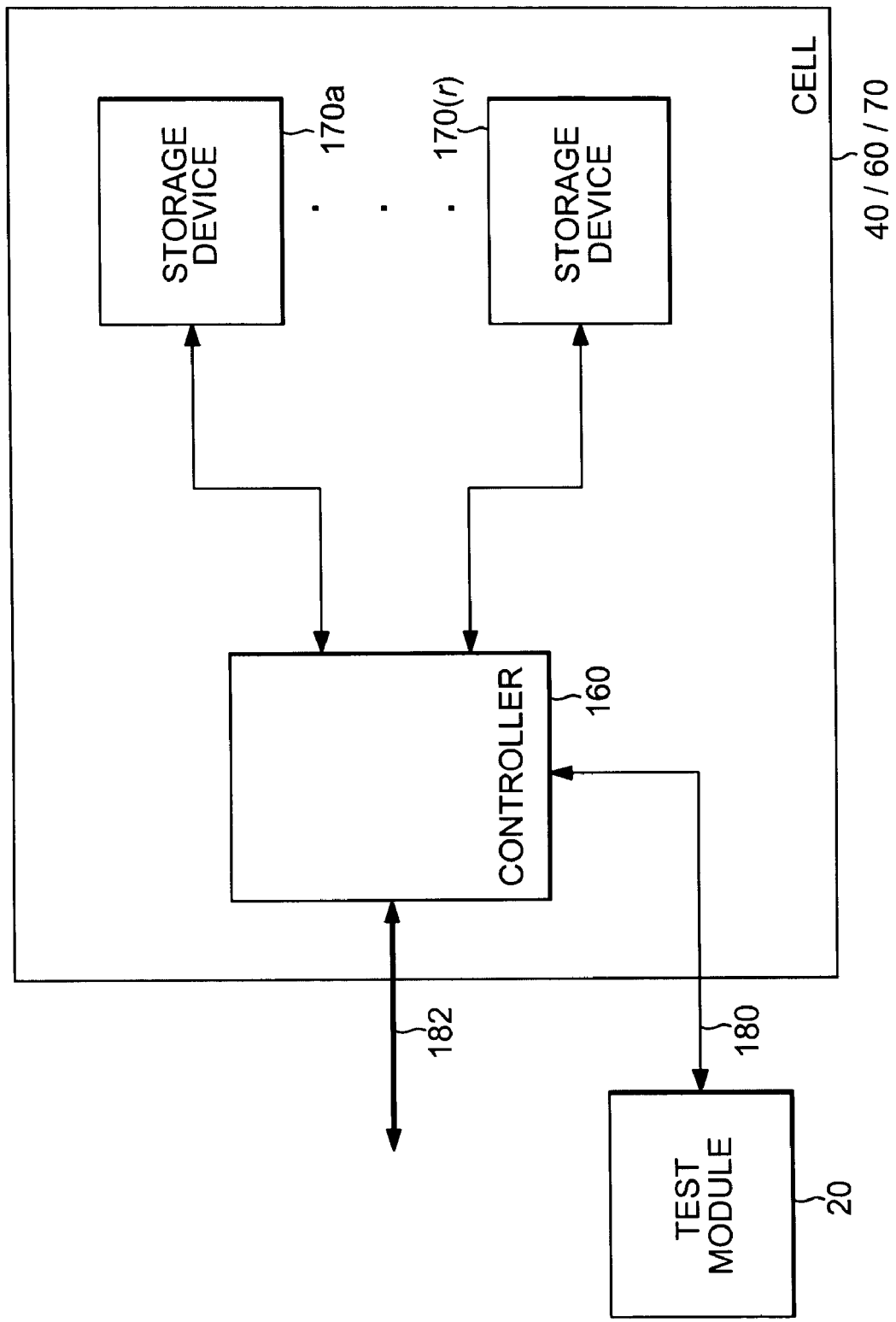
FIG. 2b is a block diagram illustrating an embodiment of selected portions of the computer system shown in FIG. 1.
Figure 2C:
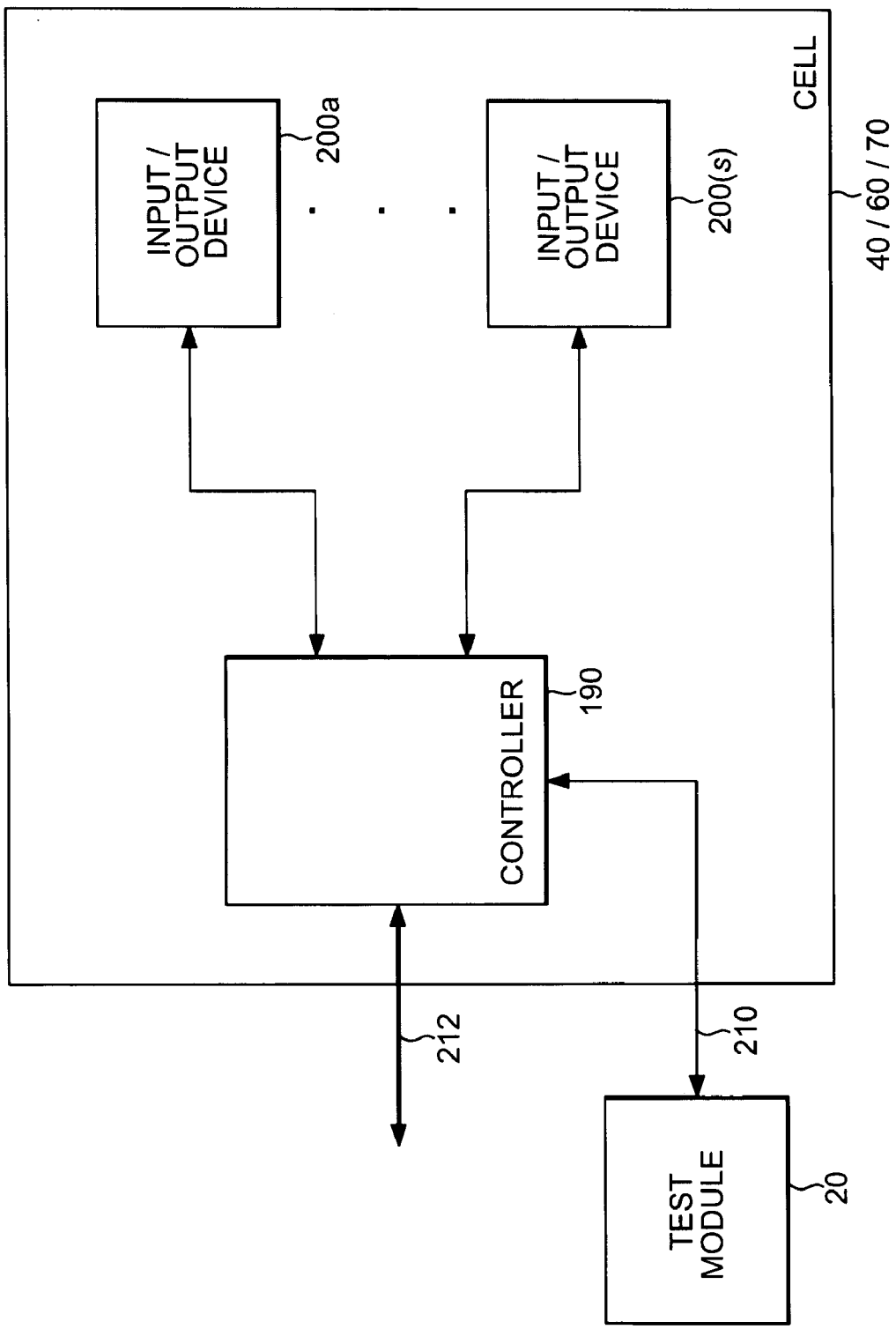
FIG. 2c is a block diagram illustrating an embodiment of selected portions of the computer system shown in FIG. 1.

As illustrated in FIGS. 2a, 2b, and 2c, cells 40, 60, and 70 may each be a processing system, a storage system, or an input/output (I/O) system. Cells 40, 60, and 70 may also be combination of a processing system, a storage system, and an input/output (I/O) system (not shown).

FIG. 2a is a block diagram illustrating an embodiment of selected portions of the computer system shown in FIG. 1 where a cell 40, 60, or 70 (hereafter, cell 40/60/70) comprises a processing system. In this embodiment, cell 40/60/70 includes processors 110a through 110(q) where q is greater than or equal to one and represents the qth processor, a core electronics complex 120, a memory 130, and a set of input/output (I/O) devices 140. Core electronics complex 120 is coupled to memory 130, I/O devices 140, and test module 20. Core electronics complex 120 may also be referred to as a chipset.

As used herein, 'processor 110' refers to any one of processors 10a through 110(q), and 'processors 110' refers to the set of processors 10a through 110(q). Processor 110a is coupled to a cache 112, and processor 110b includes a cache 114. Caches 112 and 114 may store any type of information such as instructions and data. Other processors 110 may include or be operable with any type or number of caches. Processors 110 execute instructions from an operating system (not shown) and other programs using memory 130.

Core electronics complex 120 includes a system controller 122 coupled to a set of I/O controllers 124 using one or more connections 128. System controller 122 includes a memory controller 126 which is configured to store information into and read information from memory 130 in response to write and read transactions, respectively, from processors 110 and I/O devices 140. Memory controller 126 may include hardware and/or software configured to perform memory scrubbing or other error correction functions on memory 130 in response to reading information from memory 130.

I/O controllers 124 may include any type and number of controllers configured to manage one or more I/O devices 140. Examples of I/O controllers 124 include I2C controllers, IDE/ATA controllers, SATA controllers, PCI controllers, SCSI controllers, USB controllers, IEEE 1394 (Firewire) controllers, PCMCIA controllers, parallel port controllers, and serial port controllers. In one embodiment, I/O controllers 124 comprise multiple microchips that include an intermediate bus coupled to system controller 122, PCI controllers coupled to the intermediate bus, and SCSI, IDE and others controllers coupled to the PCI controllers. As used herein, 'I/O controller 124' refers to a single I/O controller in I/O controllers 124, and 'I/O controllers 124' refers to the set of I/O controllers 124.

Memory 130 comprises any type of memory managed by memory controller 126 such as RAM, SRAM, DRAM, SDRAM, and DDR SDRAM. In response to commands from system firmware (not shown) or operating system 132, memory controller 130 may cause information to be loaded from an I/O device 140 such as a hard drive or a CD-ROM drive into memory 130.

I/O devices 140 may include any type and number of devices configured to communicate with computer system 100 using I/O controllers 124. Each I/O device 140 may be internal or external to computer system 100 and may couple to an expansion slot in a motherboard (not shown) or a connector in a chassis (not shown) that houses computer system 100 that is in turn coupled to an I/O controller 124. I/O devices 140 may include a network device (not shown) configured to allow computer system 100 to communicate with other computer systems and a storage device (not shown) configured to store information. As used herein, 'I/O device 140' refers to a single I/O device in I/O devices 140, and 'I/O devices 140' refers to the set of I/O devices 140.

Test module 20 couples to an I/O controller 124, e.g., an I2C controller, using a connection 150, e.g., an I2C connection. Test module 20 tests cell 40/60/70 using the connection 150.

Cell 40/60/70 communicates with computer system 10 using a connection 152 that is coupled to an I/O controller 124. In other embodiments, cell 40/60/70 may communicate with computer system 10 in other ways.

FIG. 2b is a block diagram illustrating an embodiment of selected portions of the computer system shown in FIG. 1 where cell 40/60/70 comprises a storage system. In this embodiment, cell 40/60/70 includes a controller 160 coupled to a set of storage devices 170a through 170(r) wherein r is greater than or equal to one and represents the rth storage device.

Test module 20 couples to port of controller 160 using a connection 180. Test module 20 tests cell 40/60/70 using the connection 180.

Cell 40/60/70 communicates with computer system 10 using a connection 182 that is coupled to controller 160. Controller 160 receives transactions, such as read and write transactions, from computer system 10 and causes information to be read from or written to one or more of storage devices 170 in response to the transactions. In other embodiments, cell 40/60/70 may communicate with computer system 10 in other ways.

FIG. 2c is a block diagram illustrating an embodiment of selected portions of the computer system shown in FIG. 1 where cell 40/60/70 comprises an input/output (I/O) system. In this embodiment, cell 40/60/70 includes a controller 190 coupled to a set of I/O devices 200a through 200(s) wherein s is greater than or equal to one and represents the sth I/O device.

Test module 20 couples to port of controller 190 using a connection 210. Test module 20 tests cell 40/60/70 using the connection 210.

Cell 40/60/70 communicates with computer system 10 using a connection 212 that is coupled to controller 190. Controller 190 receives transactions from computer system 10 and causes the transaction to be provided to I/O devices 200. Controller 190 also receives transactions from I/O devices 200 and causes the transaction to be provided to computer system 10. In other embodiments, cell 40/60/70 may communicate with computer system 10 in other ways.

Figure 3:
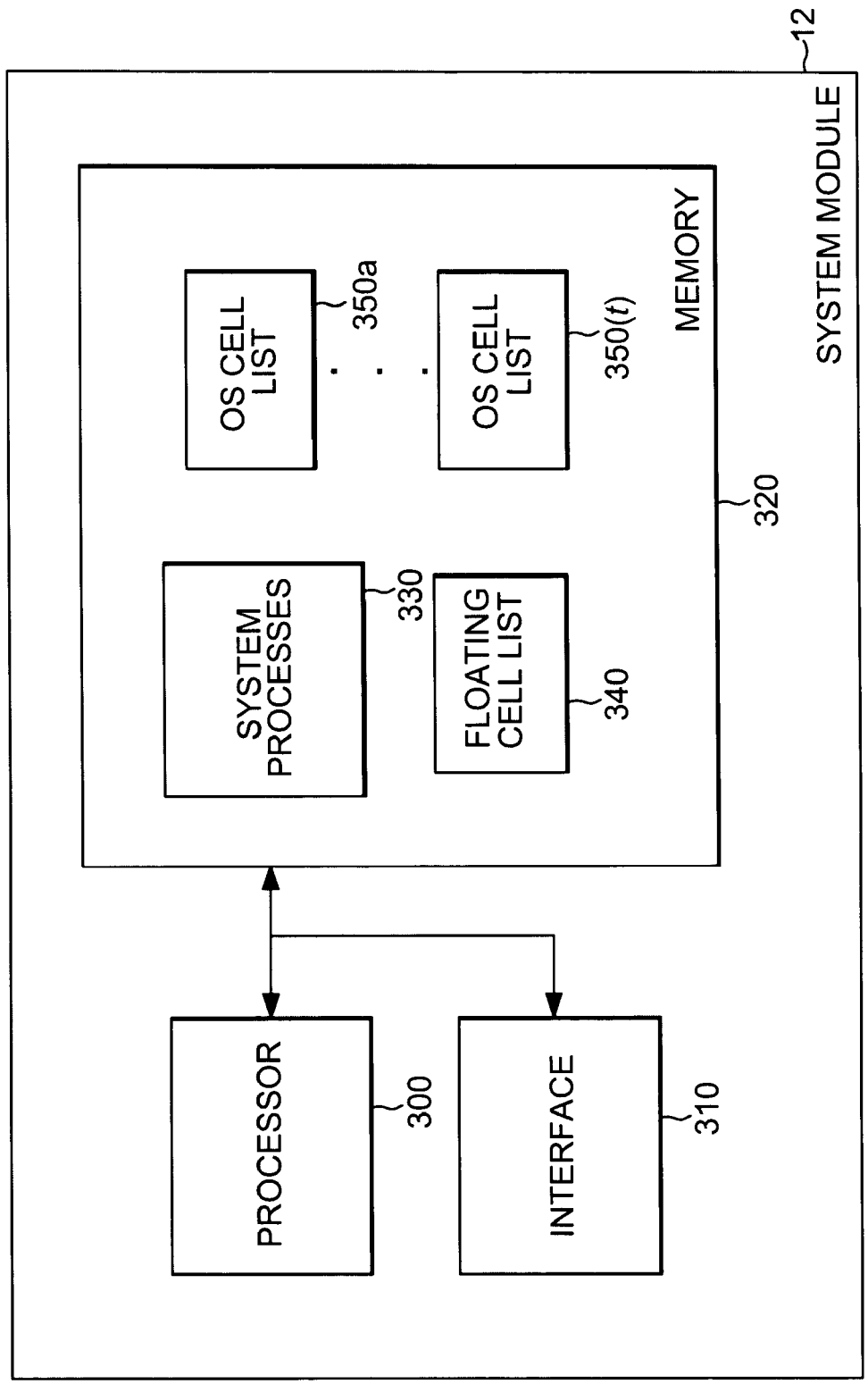
FIG. 3 is a block diagram illustrating an embodiment of a system module.

FIG. 3 is a block diagram illustrating an embodiment of system module 12. In this embodiment, system module 12 includes a processor 300, an interface 310, and a memory 320. Memory 320 includes system processes 330, a floating cell list, and a set of operating system (OS) cell lists 350a through 350(t) where t is greater than or equal to one and represents the tth OS cell list.

Processor 300 is configured to execute system processes 330 and communicate with test module 20 and cells 40, 60, and 70 using interface 310. System processes 330 include a set of software routines configured to manage cell usage by instances of an OS. System processes 330 creates and manages floating cell list 340 to track cells 40 that are not allocated to an OS instance. System processes 330 creates and manages each OS cell list 350 to track cells that are allocated to an OS instance. Each OS cell list 350 is associated with an instance of the operating system and identifies cells allocated to that instance. For example, a first OS cell list 350 lists cells 60 that are assigned to an OS instance 50a (shown in FIG. 1) and a second OS cell list 350 lists cells 70 that are assigned to an OS instance 50(m) (shown in FIG. 1).

System processes 330 also manage the testing of cells 40, 60, and 70 by identifying cells that are to be tested and causing test module 20 to test the cells during operation of computer system 10, i.e., while at least one instance of the operating system is running. System processes 330 may identify cells that are to be tested according to a schedule or other algorithm that determines when a cell 40, 60, or 70 should be tested. In one embodiment, floating cell list 340 and OS cell lists 350 include information with each cell identifier that indicates when a cell is to be tested or when a cell was previously tested. System processes 330 may use this information to identify cells that are to be tested. In another embodiment, floating cell list 340 and/or OS cell lists 350 include information with each cell identifier that indicates the applications or type of applications that a cell is running or is configured to run. The testing of cells that are running or are configured to run performance-critical applications may be deferred or delayed to allow a system to maintain performance levels. In a further embodiment, floating cell list 340 and/or OS cell lists 350 include information with each cell identifier that indicates a cell testing value that is used to determine the frequency and/or test priority of a cell. Certain cells, such as system-critical cells, may be given cell testing values that ensure that they are tested with increase regularity and/or priority of other cells in the system. In other embodiments, system processes 330 may access other information to identify cells that are to be tested.

If a cell to be tested is allocated to an OS instance, system processes 330 may cause the cell to be de-allocated from the OS instance to allow the cell to be tested. System processes 330 may cause a substitute cell to be allocated to the OS instance to replace the cell to be tested. System processes 330 cause test module 20 to be notified of cells that are to be tested using interface 310.

Figure 4:
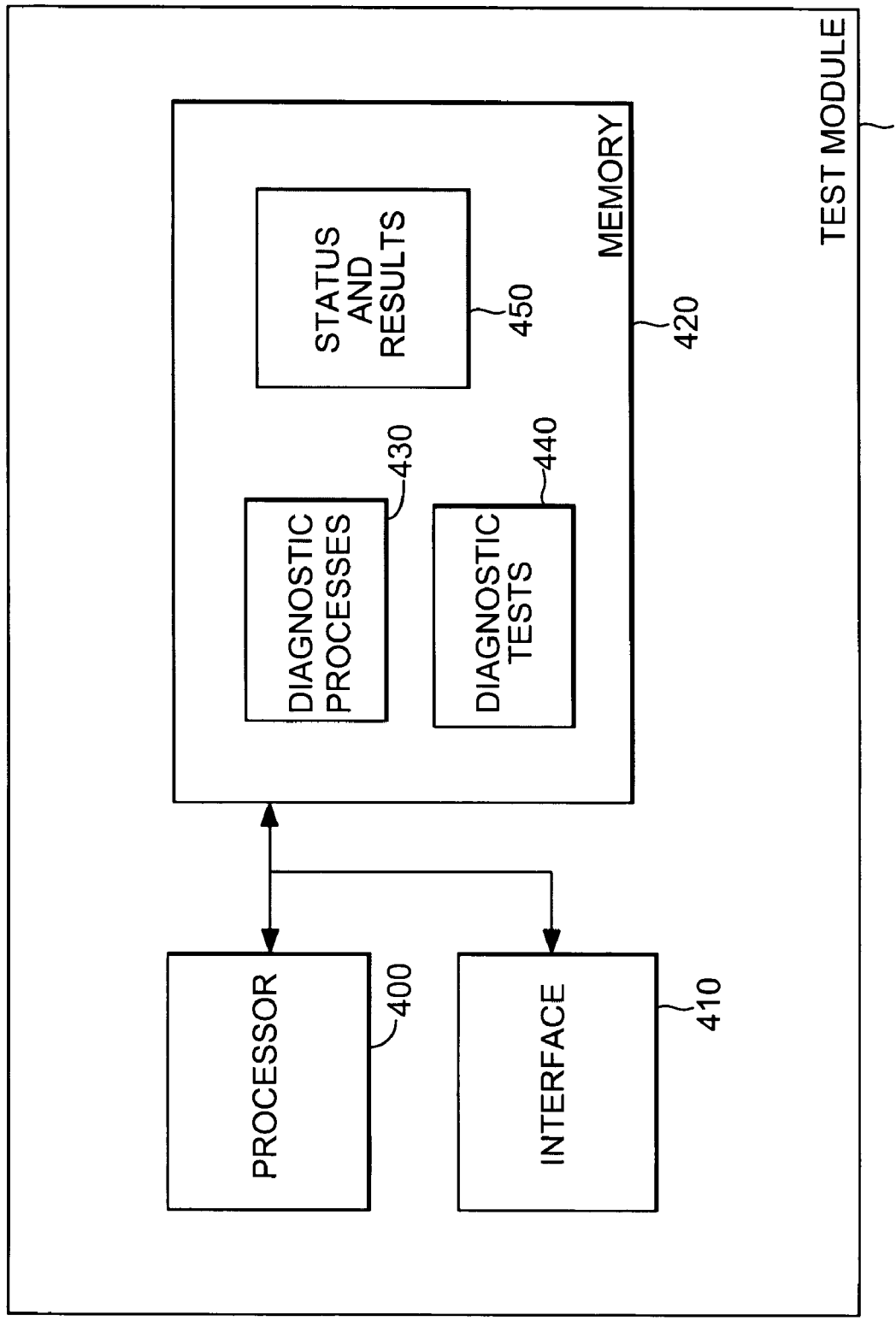
FIG. 4 is a block diagram illustrating an embodiment of a test module.

FIG. 4 is a block diagram illustrating an embodiment of a test module 20. In this embodiment, test module 20 includes a processor 400, an interface 410, and a memory 420. Memory 420 includes diagnostic processes 430, diagnostic tests 440, and status and results 450.

Processor 400 is configured to execute diagnostic processes 430 and communicate with system module 12 and cells 40, 60, and 70 using interface 410. Diagnostic processes 430 include a set of software routines configured to test cells identified by system module 12. Diagnostic processes 430 manage the execution of diagnostic tests 440 and cause remedial action to be performed in the event that an error is detected. Diagnostic tests 440 include a set of software routines that are configure to test cells and store the status and results of the tests in status and results 450. The software routines cause functional and electrical tests to be performed on a cell. If an error is detected by a diagnostic test 440, the test causes diagnostic processes 430 to be notified of the error. Diagnostic processes 430 cause remedial action to be performed in response to the error. The remedial action may include notifying the operating system and/or a system administrator of the error or keeping the cell de-allocated from use. Diagnostic processes 430 may also allow an operating system or system administrator to access status and results 450.

Subsequent to being tested, system module 12 may allocate a cell to an operating system instance 50.

Although shown as separate modules in FIGS. 1, 3, and 4, some or all of the functions of system module 12 and test module 20 may be combined into a single module in other embodiments.

Figure 5:
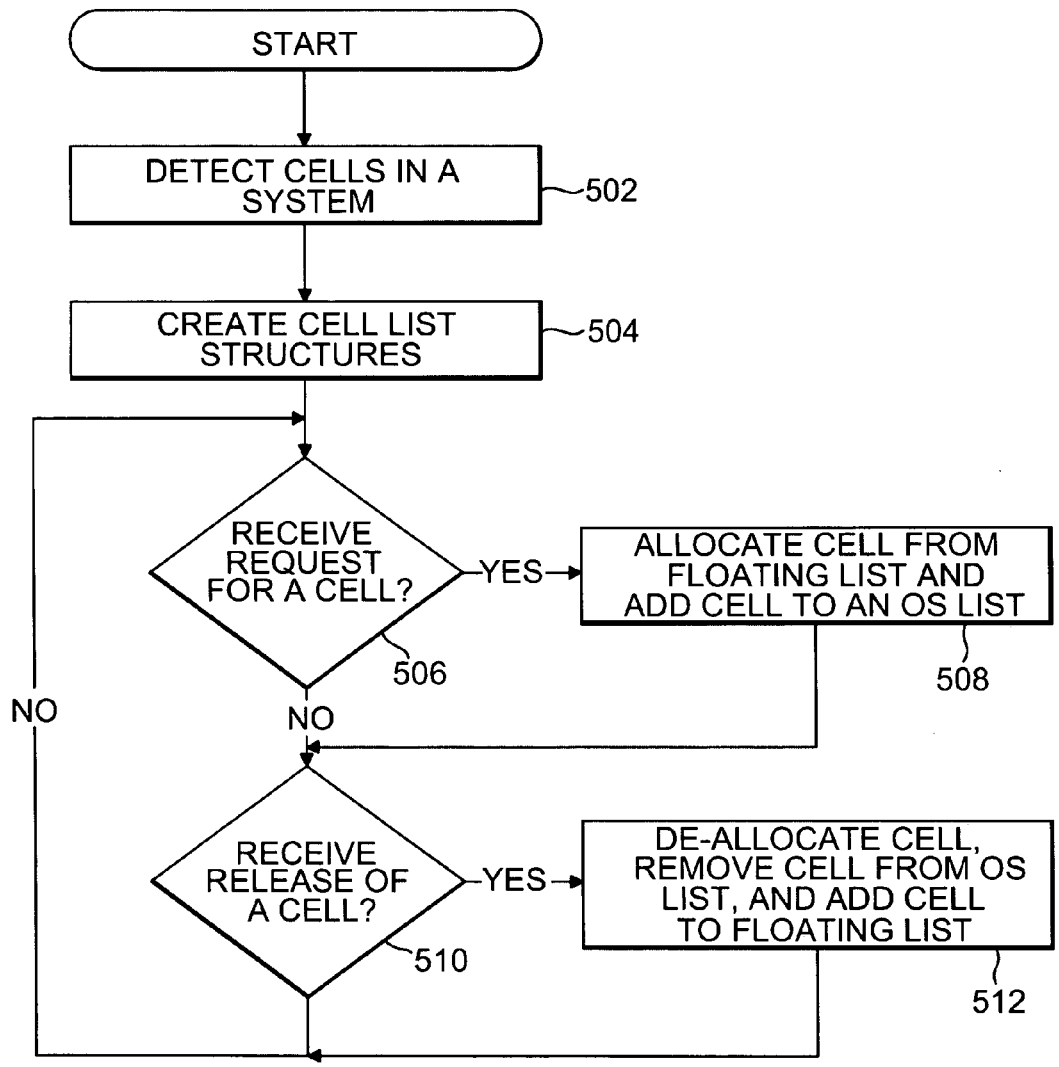
FIG. 5 is a flow chart illustrating an embodiment of method for managing cells in a computer system.
Figure 6:
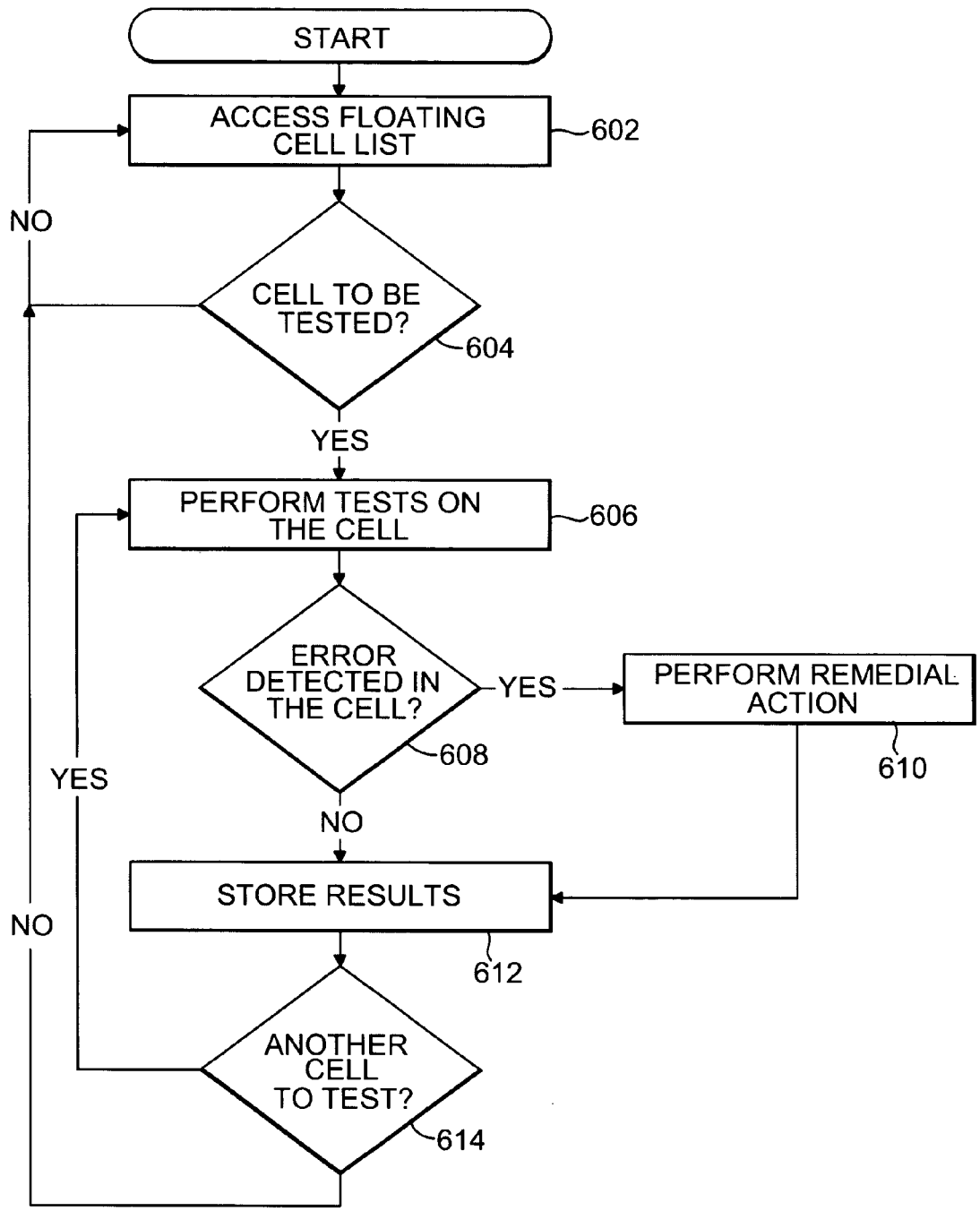
FIG. 6 is a flow chart illustrating an embodiment of method for testing floating cells in a computer system.
Figure 7:
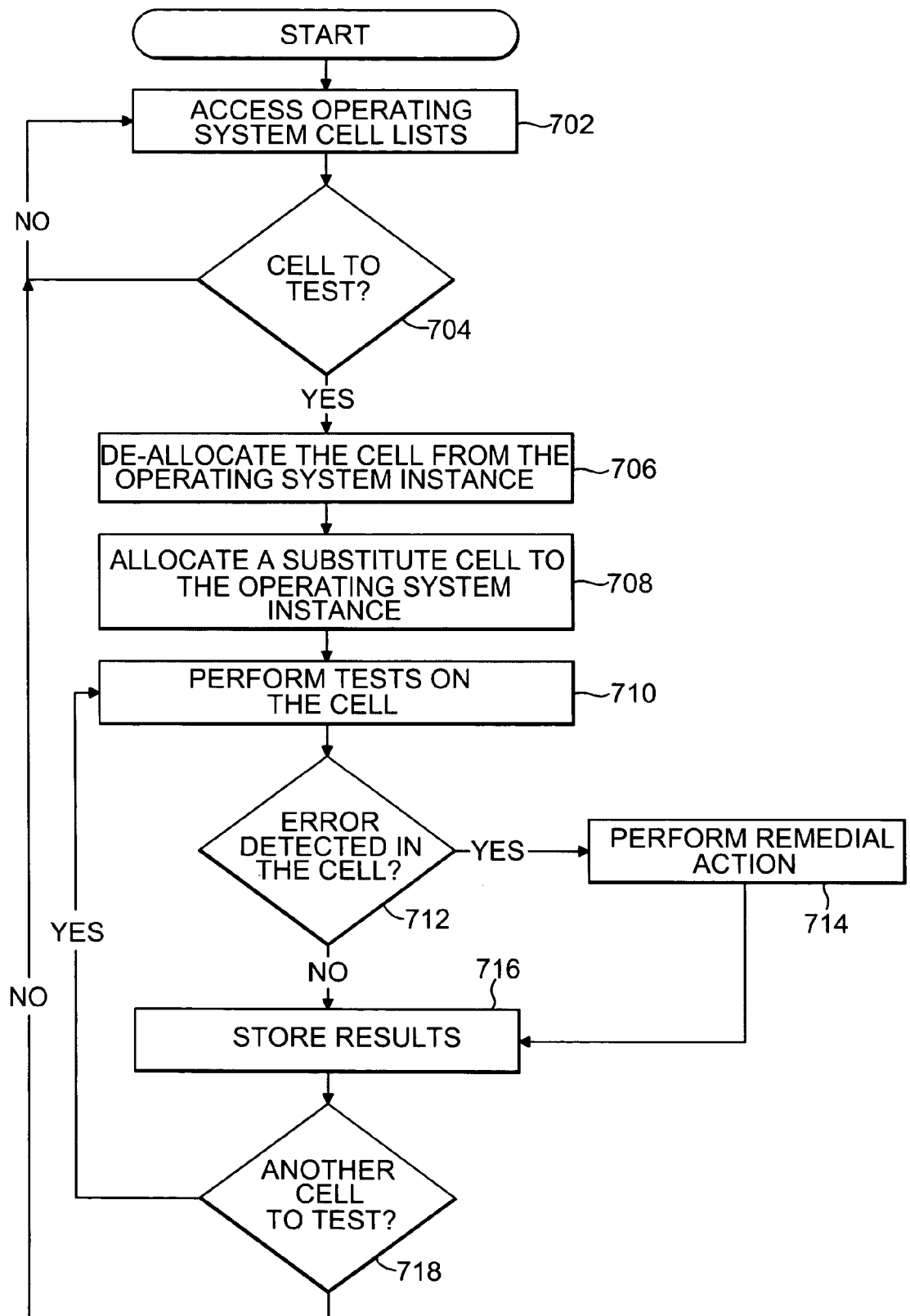
FIG. 7 is a flow chart illustrating an embodiment of method for testing allocated cells in a computer system.

FIGS. 5, 6, and 7 are flow charts illustrating embodiments of methods for managing and testing cells in computer system 10. The functions described by these methods may be performed by system module 12 in the embodiment of FIG. 1.

FIG. 5 illustrates a method for managing cells 40, 60, and 70. Cells 40, 60, and 70 may be detected in computer system 10 by system module 12 as indicated in a block 502. System module 12 may perform this function in response to computer system 10 being turned on or reset. System module 12 creates cell list structures such as floating cell list 340 and OS instance lists 350 as indicated in a block 504.

A determination is made by system module 12 as to whether a request for a cell has been received as indicated in a block 506. If a request has been received, then a cell 40 is allocated from floating list 340 and added to the OS instance list 350 associated with the OS instance that requested the cell as indicated in a block 508.

If a request has not been received, then a determination is made by system module 12 as to whether a release of a cell has been received as indicated in a block 510. If a release has been received, then a cell 60 or 70 is de-allocated from the OS instance that released the cell, removed from the OS instance list 350 associated with the OS instance, and added to floating list 340 as indicated in a block 512. The function of block 506 is repeated subsequent to the functions of blocks 510 and 512.

FIG. 6 illustrates a method for testing floating cells 40. System module 12 accesses floating cell list 340 as indicated in a block 602. A determination is made by system module 12 as to whether there is a cell 40 to be tested as indicated in a block 604. As noted above, system module 12 may make this determination according to information stored in floating cell list 340. The information may include scheduled times to test cells 40, times of previous tests of cells 40, performance-based criteria, and/or cell testing values. If there is no cell 40 to be tested, then the functions of blocks 602 and 604 may be repeated at a later time.

If there is a cell 40 to be tested, then tests are performed on cell 40 by test module 20 as indicated in a block 606. System module 12 notifies test module 20 of cell 40 to cause the cell to be tested. A determination is made by test module 20 as to whether an error has been detected in cell 40 as indicated in a block 608. If an error has been detected, then test module 20 causes system module 12 to perform remedial action as indicated in a block 610 and results of the test are stored by test module 20 as indicated in a block 612. If an error has not been detected, then results of the test are stored by test module 20 as indicated in the block 612.

Subsequent to the function of block 612, a determination is made by system module 12 as to whether there is another cell 40 to test as indicated in a block 614. If there is another cell 40 to test, then the method returns to the function of block 606. If there is not another cell 40 to test, then the method repeats the function of block 602.

FIG. 7 illustrates a method for testing allocated cells 60 and 70. System module 12 accesses OS cell lists 350 as indicated in a block 702. A determination is made by system module 12 as to whether there is a cell 60 or 70 to be tested as indicated in a block 704. As noted above, system module 12 may make this determination according to information stored in OS cell lists 350. The information may include scheduled times to test cells 60 and 70, times of previous tests of cells 60 and 70, performance-based criteria, and/or cell testing values. If there is no cell 60 or 70 to be tested, then the functions of blocks 702 and 704 may be repeated at a later time.

If there is a cell 60 or 70 to be tested, then system module 12 de-allocates cell 60 or 70 from OS instance 50 as indicated by a block 706. System module 12 allocates a substitute cell 40 from floating cell list 340 to OS instance 50 as indicated in a block 708. Tests are performed on cell 60 or 70 by test module 20 as indicated in a block 710. System module 12 notifies test module 20 of cell 60 or 70 to cause the cell to be tested. A determination is made by test module 20 as to whether an error has been detected in cell 60 or 70 as indicated in a block 712. If an error has been detected, then test module 20 causes system module 12 to perform remedial action as indicated in a block 714 and results of the test are stored by test module 20 as indicated in a block 716. If an error has not been detected, then results of the test are stored by test module 20 as indicated in the block 716.

Subsequent to the function of 716, a determination is made by system module 12 as to whether there is another cell 60 or 70 to test as indicated in a block 718. If there is another cell 60 or 70 to test, then the method returns to the function of block 710. If there is not another cell 60 or 70 to test, then the method repeats the function of block 602.

Figure 8:
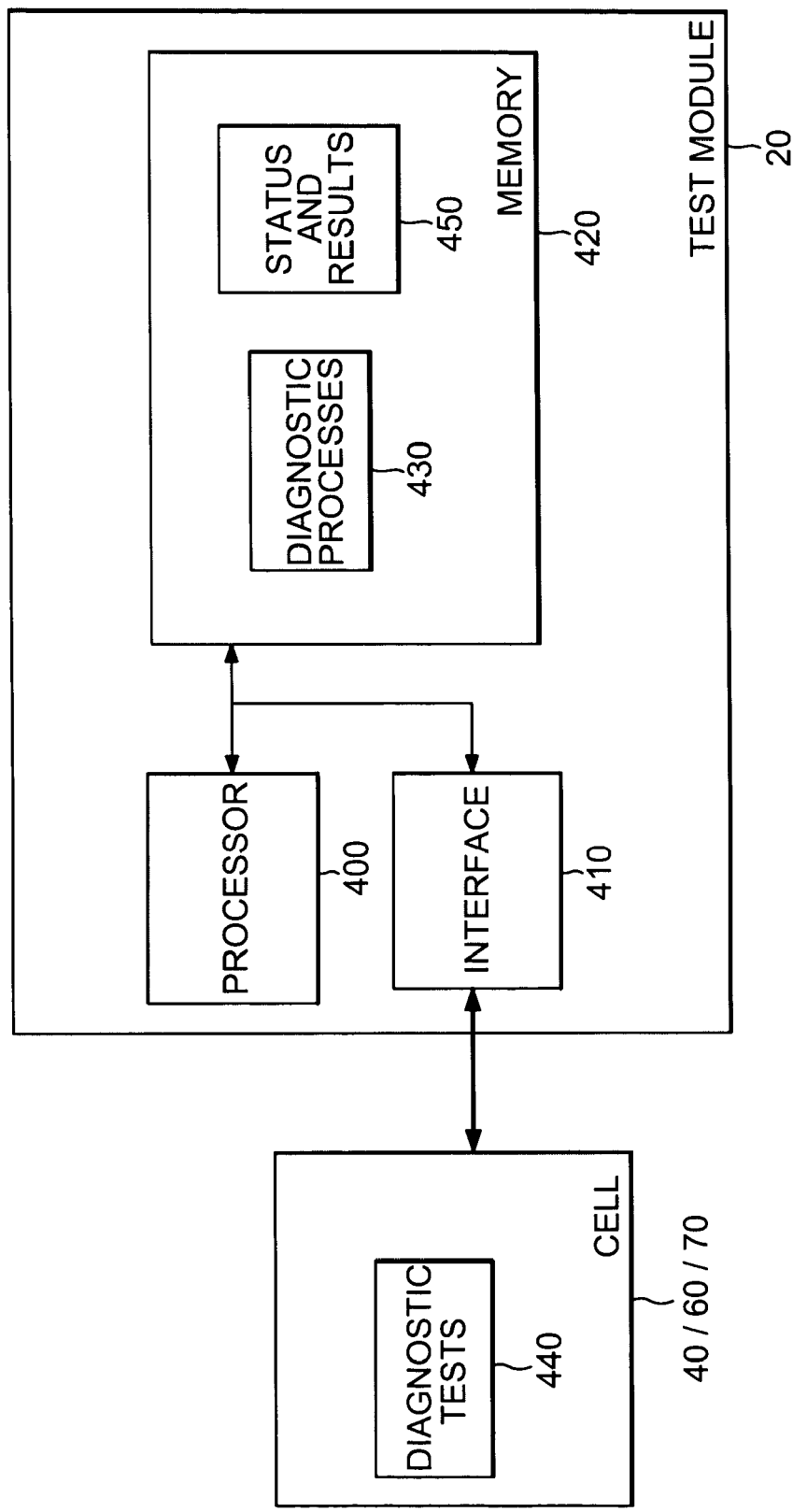
FIG. 8 is a block diagram illustrating an alternative embodiment of a test module.

FIG. 8 is a block diagram illustrating an alternative embodiment of test module 20 in computer system 10. In this embodiment, diagnostic tests 440 are located in cells 40, 60, and 70 instead of test module 20. To perform tests on cells 40, 60, and 70 in this embodiment, diagnostic processes 430 initiate the diagnostic tests 440 using interface 410, and diagnostic tests 440 execute within cells 40, 60, and 70. Diagnostic tests 440 cause status and results to be provided to test module 20 and stored in status and results 450 using interface 410. As illustrated by FIG. 8, diagnostic tests 440 may be located within cells 40, 60, and 70 rather than in test module 20 in some embodiments.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer system comprising:
a system module having a first interface;
a test module having a second interface configured to communicate with the first interface;
a first cell having a first controller configured to communicate with the first interface and the second interface; and
a second cell having a second controller configured to communicate with the first interface and the second interface;
wherein the system module is configured to cause the test module to test the first cell subsequent to the second cell being allocated to a first instance of an operating system, wherein the system module is configured to cause the first cell to be de-allocated from the first instance of the operating system prior to causing the test module to test the first cell, and wherein the system module is configured to cause the test module to test the first cell in response to accessing a list that identifies cells allocated to the first instance of the operating system.

2. The computer system of claim 1 wherein the system module is configured to cause the second cell to be allocated to the first instance of the operating system subsequent to causing the first cell to be de-allocated from the first instance of the operating system.

3. The computer system of claim 1 wherein the test module includes a diagnostic test, and wherein the test module causes the first cell to be tested using the diagnostic test.

4. The computer system of claim 1 wherein the first cell includes a diagnostic test, and wherein the test module causes the first cell to be tested by initiating the diagnostic test.

5. The computer system of claim 1 wherein the test module is configured to detect an error in response to testing the first cell, and wherein the test module is configured to cause remedial action associated with the error to be performed in response to detecting the error.

6. The computer system of claim 1 wherein the first cell comprises a processing system.

7. The computer system of claim 1 wherein the first cell comprises a storage system.

8. The computer system of claim 1 wherein the first cell comprises an input/output system.

9. The computer system of claim 1 wherein the system module is configured to allocate the first cell to a second instance of the operating system subsequent to the test module testing the first cell.

10. A method performed by a computer system comprising:
detecting that a first cell that is allocated to an operating system is to be tested;
de-allocating the first cell from the operating system in response to accessing a list that identifies cells allocated to the operating system;
allocating a second cell to the operating system subsequent to de-allocating the first cell from the operating system; and
testing the first cell with a test module that is external to the first cell subsequent to de-allocating the first cell from the operating system.

11. The method of claim 10 further comprising:
detecting that the first cell is to be tested by determining a time that the first cell was previously tested.

12. The method of claim 10 further comprising:
detecting that the first cell is to be tested by detecting a scheduled time.

13. The method of claim 10 further comprising:
storing results of testing the first cell.

14. The method of claim 10 further comprising:
allocating the first cell to the operating system subsequent to testing the cell.

15. A system comprising:
a first cell allocated to an operating system;
a first means for de-allocating the first cell from the operating system in response to accessing a list that identifies cells allocated to the operating system;
a second means for allocating a second cell to the operating system subsequent to de-allocating the first cell from the operating system; and
a third means external to the first cell for testing the first cell subsequent to the first cell being de-allocated from the operating system.

16. The system of claim 15 wherein the third means is for performing electrical tests on the first cell.

17. The system of claim 15 wherein the third means is for performing functional tests on the first cell.

18. The system of claim 15 wherein the first means is for causing the third means to test the first cell.

19. The system of claim 15 wherein the third means is for detecting an error in the first cell in response to testing the first cell, and wherein the third means is for causing remedial action to be taken in response to detecting the error.

20. A computer system comprising:
a system module having a first interface;
a test module having a second interface configured to communicate with the first interface;
a first cell having a first controller configured to communicate with the first interface and the second interface; and
a second cell having a second controller configured to communicate with the first interface and the second interface;
wherein the system module is configured to cause the test module to test the first cell subsequent to the second cell being allocated to a first instance of an operating system, and wherein the system module is configured to cause the test module to test the first cell in response to accessing a list that identifies floating cells.

* * * * *

UNITED STATES PATENT AND TRADEMARK OFFICE
CERTIFICATE OF CORRECTION

| | |
|---|---|
| PATENT NO. | : 7,418,367 B2 |
| APPLICATION NO. | : 10/699423 |
| DATED | : August 26, 2008 |
| INVENTOR(S) | : Ken G. Pomaranski et al. |

Page 1 of 1

It is certified that error appears in the above-identified patent and that said Letters Patent is hereby corrected as shown below:

In column 3, line 18, delete "10a" and insert -- 110a --, therefor.

In column 3, line 19, delete "10a" and insert -- 110a --, therefor.

In column 8, line 14, in Claim 8, after "input/output" insert -- (I/O) --.

Signed and Sealed this

Twenty-fifth Day of November, 2008

JON W. DUDAS
*Director of the United States Patent and Trademark Office*